United States Patent [19]

Drewlo

[11] Patent Number: 4,963,959
[45] Date of Patent: Oct. 16, 1990

[54] THREE-DIMENSIONAL CATHODE RAY TUBE DISPLAY

[76] Inventor: Kenneth G. Drewlo, 14091 - 92nd Place North, Maple Grove, Minn. 55369

[21] Appl. No.: 438,000

[22] Filed: Nov. 20, 1989

[51] Int. Cl.⁵ .................... H04N 13/00; H04N 13/04
[52] U.S. Cl. ........................ 358/88; 358/3; 358/250
[58] Field of Search ............................ 358/88, 250, 3

[56] References Cited

U.S. PATENT DOCUMENTS

| | | | |
|---|---|---|---|
| 4,062,045 | 12/1977 | Iwane | 358/88 |
| 4,571,616 | 2/1986 | Haisma | 358/88 |
| 4,671,632 | 6/1987 | August | 358/88 |
| 4,692,792 | 9/1987 | Street | 358/88 |
| 4,729,017 | 3/1988 | Sayanagi | 358/88 |
| 4,799,739 | 1/1989 | Newswanger | 350/3.7 |
| 4,829,365 | 5/1989 | Eichenlaub | 358/3 |
| 4,834,512 | 5/1989 | Austin | 350/419 |
| 4,853,764 | 8/1989 | Sutter | 358/3 |
| 4,853,769 | 8/1989 | Kollin | 358/88 |
| 4,872,750 | 10/1989 | Morishita | 358/88 |

*Primary Examiner*—Howard W. Britton
*Attorney, Agent, or Firm*—Haugen and Nikolai

[57] ABSTRACT

A three-dimensional image is produced on the screen of a cathode ray tube by incorporating within the tube a linear Fresnel lens and by appropriately causing the electron beam from one or more electron guns to be deflected to a viewer's left eye and images recorded by whereby images recorded by a first camera will be deflected to a viewer's left eye and images recroded by a second camera are uniquely directed to the viewer's right eye.

6 Claims, 1 Drawing Sheet

THREE-DIMENSIONAL CATHODE RAY TUBE DISPLAY

BACKGROUND OF THE INVENTION

I. Field of the Invention:

This invention relates generally video display apparatus, and more particularly to a video receiver and display system whereby the image created on the face of the cathode ray tube is perceived in three-dimensional form by the viewer.

II. Discussion of the Prior Art:

It has long been the desire in the television and computer display terminal industries to provide a 3-D presentation of images presented on the face of a cathode ray tube. Up until now, systems designed to accomplish this end have suffered from various drawbacks inherent in the particular scheme employed.

The principle of three-dimensional viewing is based upon the ability of the viewer's eyes to determine the relative depth of the object in view. This "depth perception" is created when the viewer's eyes observe an object from slightly different angles.

It is known in the art that stereographic display can be created by providing video information of a scene to the eyes as they would normally view that scene, but providing different views of the same scene to each eye. That is to say, the views of the same scene are taken from two angles that resemble the viewing angles of a person's two eyes. These two video scenes are then provided to the viewer via a cathode ray tube, typically with the aid of an electromechanical shutter device which rapidly switches back and forth to allow the viewer to focus on the face of the CRT screen as it directs alternate video frames to each eye.

For example, as set out in the May 1989 issue of *Lasers & Optics*, at page 45, the Tektronix Corporation of Beaverton, Oreg., employs a liquid crystal screen in front of the CRT face and means are provided for rapidly switching the liquid crystals much like a shutter, such that the display is alternately created for the right eye and left eye. The viewer then wears a set of polarized glasses where the lens associated with one eye is circularly polarized in a first direction and that with the other eye is circularly polarized in the opposite direction. The liquid crystal device when switched one way, polarizes all of the light in a first direction and, when electronically switched, then polarizes the light in the opposite direction. Hence, when viewed through differently polarized lenses, the left eye sees one scene at one time and the right eye subsequently sees substantially the same scene, but from a different angle, at a slightly later time The switching occurs so rapidly that it is effectively flicker-free.

Not only must the viewer wear special glasses to receive a 3-D image from the Tektronix scheme, but that device allows only half of the video information to reach each eye.

Another prior art approach also requiring the use of special glasses follows the principles employed in the 3-D movies of the early 1950's. Here, the glasses worn by the viewer are frequency filtered or color filtered and all of the information intended for one eye is encoded in one color and allowed to pass through the color filter for the given eye and likewise, all the information intended for the other eye is encoded in a different color and allowed to pass through the filter associated with that other eye. Use of this scheme naturally distorts the true colors of the image being presented on the face of the CRT.

Still another prior art approach which is somewhat more clumsy and expensive involves a special set of spectacles or glasses that have the LCD shutters individually attached for each eye and synchronized with the CRT such that the shutters associated with each eye open or blink every other frame. As a result, for one given frame, the right eye receives the image and then for a subsequent frame, the left eye receives it. This latter arrangement requires a cable or wireless linkage to the CRT to maintain synchronization between the frame switching occurring on the CRT and the shutter flipping taking place on the viewing lenses.

The Eichenlaub U.S. Pat. No. 4,829,365 describes in it various other related approaches for creating 3-D images to a viewer of a scene on a CRT and those interested in further information relating to such alternative arrangements are referred to that document.

SUMMARY OF THE INVENTION

In accordance with the present invention, a linear Fresnel lens is adhered to the inner surface of the viewing screen of a CRT and so configured so as to provide the necessary optical isolation between the viewer's two eyes such that the perception of depth can be created but without the need for special glasses worn by the viewer. The linear Fresnel lens comprises a generally flat sheet of transparent glass or plastic having grooves extending generally vertically to define a plurality of contiguous, closely spaced vertically oriented prisms which provide optical isolation in the horizontal domain, allowing independent video streams to separately enter each eye. The rear surface of the planar lens fabric, i.e., the side facing the electron gun is coated with the phosphors such that when bombarded with electrons, visible light is created and routed through the prism surfaces independently to the left and right eyes.

In accordance with another feature of the present invention, the deflection circuitry associated with the neck of the cathode ray tube are rotated from their conventional position in standard T.V. receivers so that the face of the CRT screen is swept by the electron beam in vertical strokes or lines in creating a field As such, the vertical lines traced by the electron beam can be generally aligned with the vertically oriented prisms defined by the grooves on the linear lens.

Assuming that the present invention is to be used in conjunction with displaying broadcast television images, to achieve the three-dimensional presentation, at least two television cameras will be positioned to view the scene from different points. However, the cameras are oriented so as to scan the scene in a series of vertical strokes progressing horizontally to create a field. Signals from the two cameras are then sent through an electronic signal mixer before being transmitted via a broadcast antenna. The resulting composite signal will then include the video information recorded by each of the cameras.

The video receiver includes electronics for separating the two video streams which may then, in accordance with a first arrangement of the invention, be applied to a single electron gun which time division multiplexes the video beams. In a separate embodiment, the cathode ray tube may incorporate a pair of electron guns, one for each eye.

Assuming the time division multiplexing approach is to be used, the deflection circuits are energized such that the electron beam will sweep vertically across the phosphor adhered to the linear lens causing the resulting light emission to be directed, via a prism surface, to, say, the viewer's left eye. Subsequently, a separate image is routed through a separate prism surface to the viewer's right eye.

With a two-gun approach, the guns located in the neck of the CRT are oriented so as to impinge on separate discrete surfaces of the linear lens (prisms) causing information initially seen by the left-eye camera to be directed to the left eye and the scene scanned by the right-eye camera to be directed to the right eye. Both beams can be simultaneously acted on by the deflection circuits to sweep vertically along their respective prism surfaces.

OBJECTS

It is accordingly a principal object of the present invention to provide an improved apparatus for displaying three-dimensional images on the face of a CRT screen.

Another object of the invention is to provide a three-dimensional video image without requiring the viewer to wear special glasses and without the use of a shutter for alternatively and rapidly creating two separate images.

Yet another object of the invention is to provide a special CRT display tube incorporating a lens fabric for providing optical isolation in the horizontal domain.

A yet further object of the invention is to provide a video receiver or display system incorporating a special-purpose cathode ray tube incorporating a plurality of vertically oriented prisms which may be scanned by reversing the conventional line trace from horizontal to vertical.

DESCRIPTION OF THE DRAWINGS

The foregoing features and objects of the invention will become apparent to those skilled in the art from the following detailed description of a preferred embodiment, especially when considered in conjunction with the accompanying drawings in which like numerals in the several views refer to corresponding parts.

DESCRIPTION OF THE PREFERRED EMBODIMENT

Figure 1:
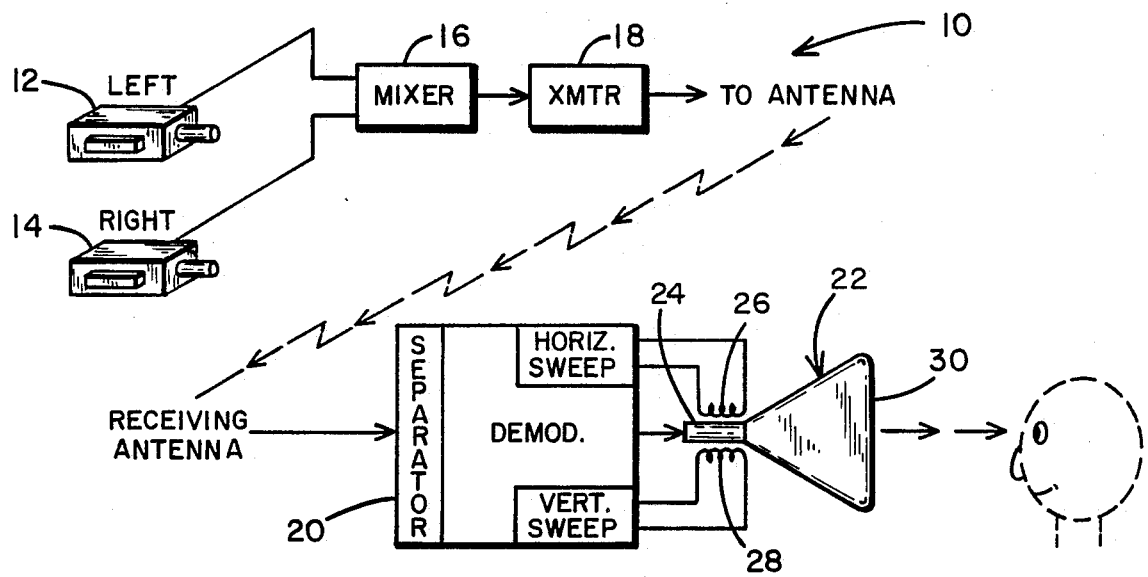
FIG. 1 is a system block diagram illustrating a television transmitting and receiving system for producing three-dimensional images to a viewer.

Referring first to FIG. 1, there is indicated generally by numeral 10 a system block diagram showing first and second video cameras 12 and 14 which are arranged to view the same scene but from slightly different angles in much the same way that a scene is perceived by a person through his left and right eyes. It is this separation and the manner in which visual images are relayed to the brain that provides a viewer with depth perception. Camera 12 is labeled "left" meaning that it corresponds to the left eye of the viewer and, similarly, camera 14 is labeled "right" meaning that it views the field similar to an individual's right eye.

Cameras 12 and 14 are physically positioned to lie sideways rather than the normal vertical disposition such that the image is scanned in the vertical direction, that is, from bottom to top or top to bottom rather than in the horizontal direction as is conventional.

The video signals are applied to a mixer circuit 16 where they are electronically combined into a composite video signal which also includes a horizontal retrace and a vertical blanking period which provides the necessary synchronization when decoded by the receiver electronics. The composite video signal from the mixer circuit 16 is then applied, via transmitter 18, to a transmitting antenna (not shown). The radiated signal is picked up by a receiving antenna (also not shown) and applied to a receiver module 20. The receiver is configured to drive a CRT 22. In particular, video information is separated in the receiver 20 and applied to an electron gun contained within the neck portion 24 of the CRT for controlling the intensity of the electron beam. Also associated with the neck 24 of the CRT are horizontal and vertical deflection coils 26 and 28, respectively The face or screen of the CRT is identified by numeral 30.

While in conventional television receivers, a field on the face of the CRT is created by first scanning even numbered lines from left to right when viewed from the front of the CRT, thus forming a field comprising 525 horizontal lines, all traced on the screen within one-sixtieth of a second. Following that, vertical retrace occurs and all of the odd-numbered lines are then painted on the screen in a second one-sixtieth of a second to create an interlaced presentation.

For reasons which will become apparent as the description of the preferred embodiment proceeds, in carrying out the present invention, 525 vertical lines are painted in creating a field followed by a horizontal retrace, and then a second 525 vertical lines are painted which are interlaced with the first set of lines.

Figure 2:
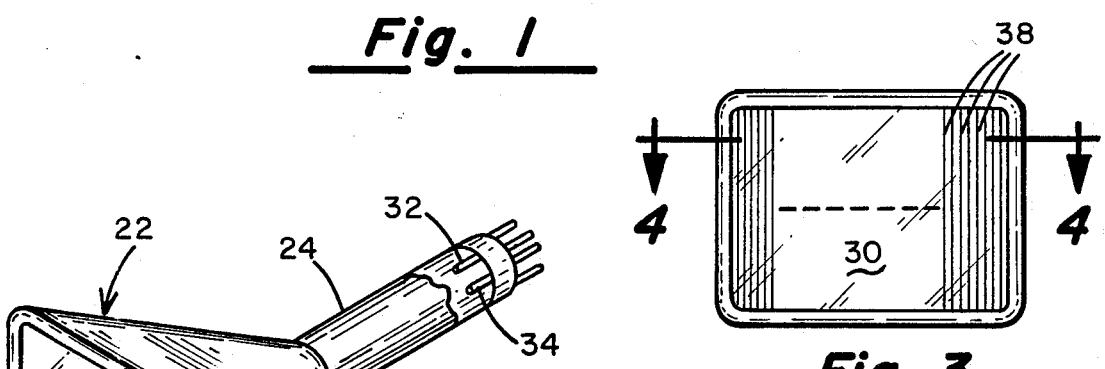
FIG. 2 illustrates a CRT tube associated with the receiver for displaying three-dimensional images.

FIG. 2 is a perspective view of a CRT tube fabricated in accordance with the present invention. The neck portion 24 thereof is shown broken away to reveal a pair of electron guns 32 and 34 which are physically separated from one another by a slight distance. Affixed to the inside surface of the glass viewing screen 30 is a linear Fresnel lens 36 which includes a plurality of very closely spaced grooves as at 38. The lens is generally transparent and may be made from a variety of clear acrylics or other plastics in a molding operation. Alternatively, it may be formed with glass and, in this regard, the grooves may be formed directly on the glass face of the CRT screen. Fresnel lenses similar to the one used in carrying out the present invention are available from Fresnel Technologies, Inc. of Fort Worth, Tex., and can be obtained with a wide variety of optical characteristics.

The grooves 38 in the linear Fresnel lens are oriented vertically relative to the viewing screen 30 and, as such, are aligned with the direction of line scanning of the electron beams emitted by the guns 32 and 34.

Figure 3:
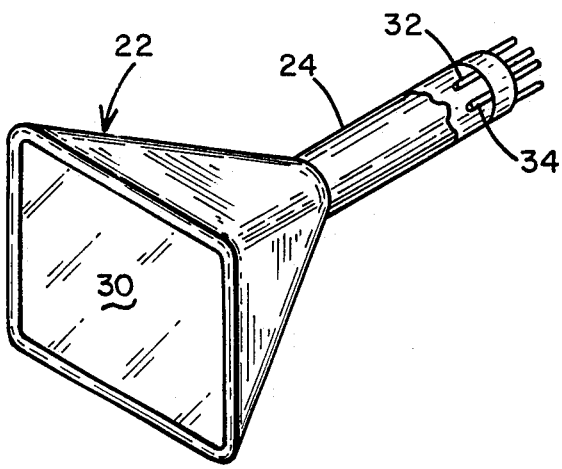
FIG. 3 is a plan view of the screen of the CRT of FIG. 2.
Figure 4:
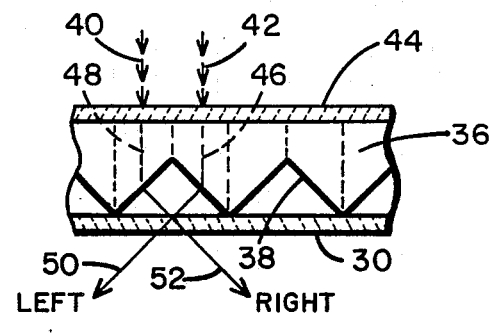
FIG. 4 is a greatly enlarged partial sectional view taken along the line 4—4 in FIG. 3.

Referring to FIG. 4, there is shown a cross-sectional view taken along the lines 4—4 in FIG. 3. The arrows 40 and 42 represent electron beams from the separate electron guns which are directed toward the screen of the CRT and, at the same time, are appropriately deflected so as to sweep out vertical lines on the face of the tube. The electron beams first impinge upon a layer of phosphor 44 causing light rays represented by the dotted lines 46 and 48 to impinge upon the angled surfaces of the grooves 38. The light beam is refracted by the lens material causing the separate beams to diverge as indicated by the rays 50 and 52. Because the respective rays diverge in opposite directions, optical isolation in the horizontal domain takes place so that a viewer, properly positioned relative to the face of the screen, will have the images recorded by the left camera 12 directed to his left eye and those of the right camera 14 directed at the right eye.

Figure 5:
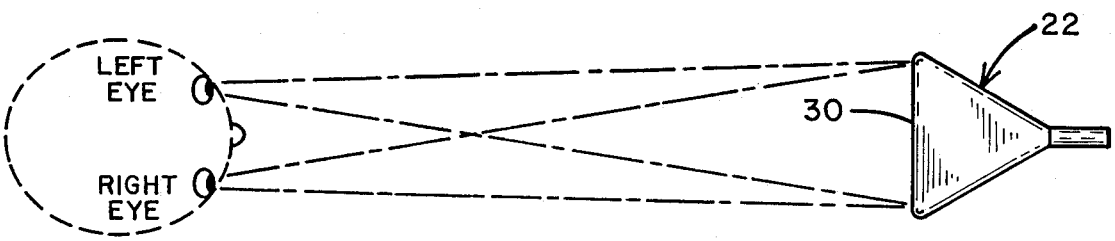
FIG. 5 is a diagram illustrating the manner in which light rays reaching a viewer's left and right eyes are isolated

FIG. 5 illustrates schematically a viewer positioned approximately 2½ to 3 feet from the viewing screen 30 of the cathode ray tube 22. Because of the manner in which the two beams per line scan are made to diverge by the linear Fresnel lens 36, the left eye will see only the image recorded by the left-eye camera 12 while the viewer's right eye will perceive only the image recorded by the right-eye camera 14. Because the viewer is receiving independent video streams related to each of his or her eyes, the result will be the perception of depth.

It is also possible to practice the present invention utilizing a cathode ray tube having only a single electron gun rather than two guns as depicted in FIG. 2. With the single-gun approach, the scanning of vertical lines is time-division multiplexed such that images recorded by the left-eye camera are deflected so as to impinge upon the linear Fresnel lens so that the resulting light beams will be refracted in a first direction, e.g., to be received by the left eye while subsequently the same beam is deflected so as to impinge upon prisms surfaces causing refraction of the light beam toward the right eye. Of course, the composite video signals from the two cameras must be separated and synchronized at the receiving set so a to modulate the intensity of the electron beam as a function of the signal levels being generated by the two cameras.

This invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. A cathode ray tube display for presenting three-dimensional images to a viewer, comprising:
   (a) an evacuated glass tube having a cylindrical neck portion flaring out to a generally planar viewing screen, said screen having an inner face and an outer face;
   (b) electron gun means contained in said neck portion;
   (c) a linear lens having a plurality of vertically oriented prism surfaces adhered to said inner face of said screen; and
   (d) a phosphor coating on said linear lens for emitting light when impacted by said beam of electrons, said linear lens directing the light in different diverging directions relative to the center of said viewing screen, depending upon the point on said linear lens being impacted by said beam of electrons.

2. The cathode ray tube display as in claim 1 and further including deflection coil means surrounding said neck portion on the exterior thereof for steering said beam of electrons emitted from said electron gun means to predetermined locations on said linear lens.

3. The cathode ray tube display as in claim 2 and further including sweep circuit means coupled to said deflection coil means for causing said electron beam to scan along generally vertical lines in generating a horizontal field on said screen.

4. The cathode ray tube display as in claim 2 wherein said electron gun means includes a pair of electron guns, one of said electron guns producing an electron beam directed at first surfaces of said linear lens and the other of said electron guns producing an electron beam directed at second surfaces of said linear lens.

5. The cathode ray tube display as in claim 4 and further including sweep circuit means coupled to said deflection coil means for causing said electron beams from said pair of electron guns to sweep along vertical lines in scanning horizontal field.

6. Apparatus for producing three-dimensional television images to a viewer comprising:
   (a) a television receiver having a cathode ray tube for projecting a beam of electrons on a viewing screen and horizontal and vertical deflection means surrounding a portion of said tube;
   (b) line oscillator means coupled to said vertical deflection means and field oscillator means coupled to said horizontal deflection means for successfully producing a vertical sweep raster scan of a predetermined number of vertical lines per field; and
   (c) means affixed to said viewing screen for separately directing images associated with a first set of vertical scan lines to one eye of the viewer and images associated with another set of vertical scan lines to the other eye of the viewer.

* * * * *